US012747320B2

(12) United States Patent
Im et al.

(10) Patent No.: US 12,747,320 B2
(45) Date of Patent: Sep. 29, 2026

(54) POLYCARBONATE AND METHOD FOR PREPARING SAME

(71) Applicant: LG CHEM, LTD., Seoul (KR)

(72) Inventors: Seoyoung Im, Daejeon (KR); Hanbit Jang, Daejeon (KR); Hoyong Lee, Daejeon (KR); Cheol Jun Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 665 days.

(21) Appl. No.: 18/273,523

(22) PCT Filed: Jan. 12, 2022

(86) PCT No.: PCT/KR2022/000529

§ 371 (c)(1),
(2) Date: Jul. 20, 2023

(87) PCT Pub. No.: WO2022/164084

PCT Pub. Date: Aug. 4, 2022

(65) Prior Publication Data

US 2024/0117114 A1 Apr. 11, 2024

(30) Foreign Application Priority Data

Feb. 1, 2021 (KR) ........................ 10-2021-0014001

(51) Int. Cl.
*C08G 64/16* (2006.01)
*C08G 64/30* (2006.01)
*C08L 69/00* (2006.01)

(52) U.S. Cl.
CPC ....... *C08G 64/1641* (2013.01); *C08G 64/305* (2013.01); *C08G 64/307* (2013.01); *C08G 2261/3221* (2013.01); *C08G 2261/592* (2013.01)

(58) Field of Classification Search
None
See application file for complete search history.

(56) References Cited

U.S. PATENT DOCUMENTS 6,096,853 A * 8/2000 Amerik ................ C08G 73/105 528/196
6,291,629 B1 9/2001 Kricheldorf et al.
8,426,092 B2 4/2013 Qi et al.
2005/0288405 A1 12/2005 Wit et al.
2009/0105438 A1 4/2009 Brack et al.
2011/0160406 A1 6/2011 De Brouwer et al.
2012/0149863 A1 6/2012 Morizur
2018/0208764 A1 7/2018 Ando et al.
2019/0010280 A1* 1/2019 Motoyoshi ............. B65D 65/38
2021/0332185 A1 10/2021 Hwang et al.

FOREIGN PATENT DOCUMENTS

| | | | | |
|---|---|---|---|---|
| CN | 1331678 | A | 1/2002 | |
| CN | 108603018 | A | 9/2018 | |
| CN | 110591063 | A | 12/2019 | |
| CN | 111205448 | A * | 5/2020 | ........... C08G 64/305 |
| JP | 2001-522927 | A | 11/2001 | |
| JP | 2013515841 | A | 5/2013 | |
| KR | 103249758 | A | 8/2013 | |
| KR | 10-2013-0140699 | A | 12/2013 | |
| KR | 10-1608411 | B1 | 4/2016 | |
| KR | 10-2017-0028831 | A | 3/2017 | |
| KR | 10-1875597 | B1 | 7/2018 | |
| KR | 10-2020-0021338 | A | 2/2020 | |
| KR | 10-2020-0119608 | A | 10/2020 | |
| KR | 10-2199925 | B1 | 1/2021 | |
| TW | 2020-30173 | A | 8/2020 | |
| WO | 98-34974 | A1 | 8/1998 | |
| WO | 1999-024529 | A1 | 5/1999 | |
| WO | 2000037442 | A | 6/2000 | |
| WO | 2020-226118 | A1 | 11/2020 | |

OTHER PUBLICATIONS

Kricheldorf, H. R. et al., "Thermosetting, cholesteric oligoesters containing maleimide or nadimide end groups", Macromol. Chem. Phys., (1998), vol. 199, pp. 783-790.

* cited by examiner

*Primary Examiner* — Ha S Nguyen
(74) *Attorney, Agent, or Firm* — BRYAN CAVE LEIGHTON PAISNER LLP

(57) ABSTRACT

The present application relates to a polycarbonate including units represented by Chemical Formula 1a or 1b and Chemical Formula 1c, a composition including the same, and a molded article prepared from the composition.

13 Claims, No Drawings

POLYCARBONATE AND METHOD FOR PREPARING SAME

The present application is a National Phase entry pursuant to 35 U.S.C. § 371 of International Application No. PCT/KR2022/000529 filed on Jan. 12, 2022, and claims priority to and the benefit of Korean Patent No. 10-2021-0014001 filed in the Korean Intellectual Property Office on Feb. 1, 2021, the entire contents of which are incorporated herein by reference.

FIELD

The present invention relates to a polycarbonate and a preparation method thereof. More specifically, the present invention relates to a polycarbonate having high hardness and/or heat resistance, and a preparation method thereof.

BACKGROUND

A polycarbonate resin is a polymer material, which has been used in various fields such as exterior materials of electrical and electronic products, automobile parts, construction materials, and optical parts.

Polycarbonate is a material extracted from bisphenol A petroleum and has a problem in that in order to increase the hardness, additional processes such as hard coating and costs are required, and the durability is reduced.

Therefore, there is a need for the development of a polycarbonate with improved durability while maintaining excellent physical properties of the polycarbonate itself.

SUMMARY

An exemplary embodiment of the present invention has been made in an effort to provide a polycarbonate having a novel structure, and a preparation method thereof.

Another exemplary embodiment of the present invention has been made in an effort to provide a composition including a polycarbonate having a novel structure, and a molded article prepared from the composition.

An exemplary embodiment of the present invention provides a polycarbonate including a unit represented by the following Chemical Formula 1a or 1b and a unit represented by the following Chemical Formula 1c.

[Chemical Formula 1a]

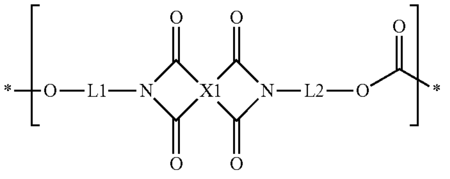

[Chemical Formula 1b]

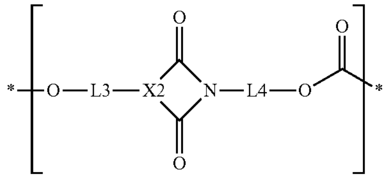

-continued

[Chemical Formula 1c]

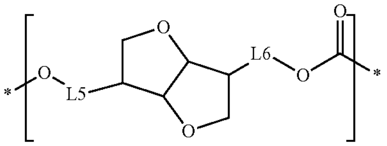

In Chemical Formulae 1a, 1b and 1c,

X1 is one selected from a substituted or unsubstituted aliphatic ring and a substituted or unsubstituted aromatic ring, or a tetravalent group in which two or more of them are linked by a single bond; a substituted or unsubstituted straight-chained or branched alkylene; O or CO, X2 is one selected from a substituted or unsubstituted aliphatic ring and a substituted or unsubstituted hydrocarbon ring, or a trivalent group in which two or more of them are linked by a single bond; a substituted or unsubstituted straight-chained or branched alkylene; 0 or CO, L1 to L6 are the same as or different from each other, and are each one selected from a single bond, a substituted or unsubstituted straight-chained or branched alkylene, a substituted or unsubstituted cycloalkylene and a substituted or unsubstituted arylene, or a divalent group in which two or more of them are linked by a single bond, a plurality of units of Chemical Formulae 1a, 1b and 1c included in the polycarbonate is each the same as or different from each other, and

* means a site linked to the main chain of the polycarbonate.

An exemplary embodiment of the present invention provides a method for preparing the polycarbonate according to the above-described exemplary embodiment, the method including: polymerizing a composition including a compound of the following Chemical Formula 12a or 12b, a compound of the following Chemical Formula 12c, and a carbonate precursor.

[Chemical Formula 12a]

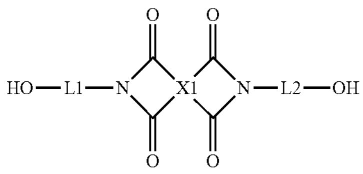

[Chemical Formula 12b]

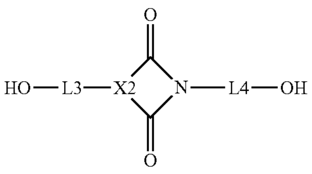

[Chemical Formula 12c]

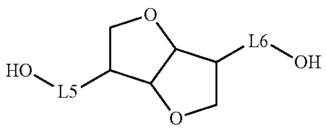

In Chemical Formulae 12a, 12b and 12c, the definitions of the substituents X1, X2, and L1-L6 are the same as those in Chemical Formulae 1a, 1b and 1c.

Another exemplary embodiment of the present invention provides a composition including the polycarbonate according to the above-described exemplary embodiment.

Still another exemplary embodiment of the present invention provides a molded article prepared from a composition including the polycarbonate according to the above-described exemplary embodiment.

The polycarbonate according to some exemplary embodiments of the present invention has a high hardness.

The polycarbonate according to some exemplary embodiments of the present invention has excellent heat resistance.

Therefore, by using a polycarbonate having high hardness or excellent heat resistance, the polycarbonate can be utilized in a wide range of fields such as lenses, glass, optical parts and vehicle parts that require excellent mechanical strength or heat resistance.

DETAILED DESCRIPTION

Hereinafter, specific exemplary embodiments will be described in more detail.

In the present specification, a cycloalkylene may be a monocyclic or polycyclic cycloalkylene. Specifically, the cycloalkylene may be a cycloalkylene having 3 to 20 carbon atoms; a monocyclic or polycyclic cycloalkylene having 6 to 18 carbon atoms; or a monocyclic or polycyclic cycloalkylene having 6 to 12 carbon atoms. More specifically, the cycloalkylene may be a divalent group derived from an alicyclic hydrocarbon such as cyclopentylene, cyclohexylene, or cycloheptylene as the monocyclic cycloalkylene, and may be adamantane-diyl, norbonane-diyl, and the like as the polycyclic cycloalkylene. However, the cycloalkylene is not limited thereto. Further, the cycloalkylene may be unsubstituted or substituted one or more with an alkyl group having 1 to 10 carbon atoms, an alkoxy having 1 to 10 carbon atoms, or a halogen.

In the present specification, the description on the cycloakylene may be applied, except that cycloalkyl is a monovalent group rather than a divalent group.

In the present specification, a heterocycloalkylene may be a monocyclic or polycyclic heterocycloalkylene group including O, S, Se or N as a heteroatom. Specifically, the heterocycloalkylene may be a heterocycloalkylene having 1 to 20 carbon atoms; a monocylic or polycyclic heterocycloalkylene having 2 to 18 carbon atoms; or a monocyclic or polycyclic heterocycloalkylene having 2 to 12 carbon atoms. More specifically, examples of the heterocycloalkylene include dioxanylene, dithianylene, and the like.

In the present specification, the description on the heterocycloakylene may be applied, except that heterocycloalkyl is a monovalent group rather than a divalent group.

In the present specification, a straight-chained or branched alkylene may be a straight-chained or branched alkylene as a divalent group derived from an aliphatic hydrocarbon having 1 to 10, or 1 to 5 carbon atoms. Specific examples of the alkylene include methylene, ethylene, propylene, n-propylene, isopropylene, butylene, n-butylene, isobutylene, tert-butylene, sec-butylene, 1-methyl-butylene, 1-ethyl-butylene, pentylene, n-pentylene, isopentylene, neopentylene, tert-pentylene, hexylene, n-hexylene, 1-methylpentylene, 2-methylpentylene, 4-methyl-2-pentylene, 3,3-dimethylbutylene, 2-ethylbutylene, heptylene, n-heptylene, 1-methylhexylene, octylene, n-octylene, tert-octylene, 1-methylheptylene, 2-ethylhexylene, 2-propylpentylene, n-nonylene, 2,2-dimethylheptylene, 1-ethyl-propylene, 1,1-dimethyl-propylene, isohexylene, 2-methylpentylene, 4-methylhexylene, 5-methylhexylene, and the like, but are not limited thereto.

In the present specification, the description on the straight-chained or branched alkylene may be applied, except that a straight-chained or branched alkyl is a monovalent group rather than a divalent group.

In the present specification, the alkyl includes a straight-chained alkyl, a branched alkyl and a cycloalkyl, unless otherwise limited.

In the present specification, an arylene may be a monocyclic or polycyclic arylene, and the number of carbon atoms thereof is not particularly limited, but is preferably 6 to 30, and may be 6 to 20. Specific examples of the monocyclic arylene include phenylene, biphenylylene, terphenylylene, and the like, but are not limited thereto. When the arylene is a polycyclic arylene, the number of carbon atoms thereof is not particularly limited, but is preferably 10 to 30, and may be 10 to 20. Specific examples of the polycyclic arylene include naphthylene, anthracenylene, phenanthrenylene, triphenylenylene, pyrenylene, phenalenylene, perylenylene, chrysenylene, fluorenylene, and the like, but are not limited thereto.

In the present specification, the description on the arylene may be applied, except that aryl is a monovalent group rather than a divalent group.

In the present specification, a heteroarylene includes one or more atoms other than carbon, that is, one or more heteroatoms, and specifically, the heteroatom includes one or more atoms selected from the group consisting of O, N, Se, S, and the like. The number of carbon atoms of the heteroarylene is not particularly limited, but is preferably 1 to 30, and may be 1 to 20. The heteroarylene may be monocyclic or polycyclic. Examples of the heteroarylene include a thiophene group, a furan group, a pyrrole group, an imidazole group, a thiazole group, an oxazole group, an oxadiazole group, a pyridine group, a bipyridine group, a pyrimidine group, a triazine group, a triazole group, an acridine group, a pyridazine group, a pyrazine group, a quinoline group, a quinazoline group, a quinoxaline group, a phthalazine group, a pyridopyrimidine group, a pyridopyrazine group, a pyrazinopyrazine group, an isoquinoline group, an indole group, a carbazole group, and the like, but are not limited thereto.

In the present specification, the description on the heteroarylene may be applied, except that heteroaryl is a monovalent group rather than a divalent group.

In the present specification, a divalent aliphatic hydrocarbon group means the above-described straight-chained or branched alkylene, cycloalkylene, heterocycloalkylene, and the like.

In the present specification, an alkoxy may be an alkoxy group having 1 to 10, or 1 to 5 carbon atoms. Specific examples of the alkoxy group include methoxy, ethoxy, n-propoxy, isopropoxy, n-butoxy, isobutoxy, tert-butoxy, sec-butoxy, 1-methyl-butoxy, 1-ethyl-butoxy, pentoxy, or the like, but are not limited thereto.

In the present specification, a halogen is a fluoro, chloro, bromo, or iodo group.

In the present specification, haloalkyl means that some or all of an alkyl has been substituted with a halogen group.

In the present specification, the description on the above-described cycloalkylene or heterocycloalkylene may be applied to an aliphatic ring, and the description on the arylene or heteroarylene may be applied to an aromatic ring.

In the present specification, isosorbide is not particularly limited to stereochemistry, and may include an isomer of isosorbide.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or more substituents selected from the group consisting of a halogen; nitro ($NO_2$); nitrile (CN); haloalkyl; COOR; alkyl; cycloalkyl; heterocycloalkyl; alkoxy; aryl; and heteroaryl, being substituted with a substituent to which two or more substituents among the exemplified substituents are linked, or having no substituent. Herein, R is alkyl, cycloalkyl, heterocycloalkyl, alkoxy, aryl or heteroaryl.

In the present specification, * means a binding site to another structure.

An exemplary embodiment of the present invention provides a polycarbonate including a unit represented by the following Chemical Formula 1a or 1b and a unit represented by the following Chemical Formula 1c.

[Chemical Formula 1a]

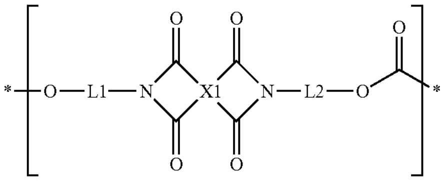

[Chemical Formula 1b]

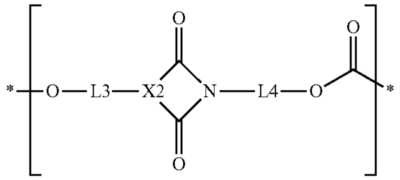

[Chemical Formula 1c]

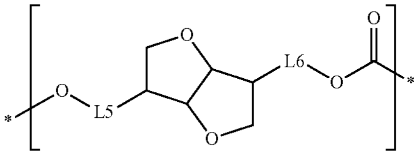

In Chemical Formulae 1a, 1b and 1c, the definitions of the substituents X1, X2 and L1-L6 are the same as those described above.

Chemical Formula 1c is not particularly limited to stereochemistry.

The structure of Chemical Formula 1a or 1b is a monomer mainly used for polyimide, and is one of the monomers of the representative heat-resistant polymer. Chemical Formula 1a or 1b are known to have excellent mechanical properties, good dimensional stability, excellent wear resistance, chemical resistance, and flame retardancy. Hardness characteristics are excellent due to a structural feature in which the hetero ring of Chemical Formula 1c is linked, and when a compound derived from a unit represented by Chemical Formula 1a or 1b and a unit represented by Chemical Formula 1c is used, the heat resistance and strength of a polycarbonate may be improved.

Specifically, when a polycarbonate is polymerized alone from the unit represented by the Chemical Formula 1a or 1b, a phenomenon is observed in which the polymerized product is easily cracked, and the degree of polymerization is lowered. The unit represented by Chemical Formula 1c has characteristics in which the hardness of the polycarbonate becomes excellent due to the hetero ring.

In addition, since the unit represented by Chemical Formula 1c is a unit derived from an eco-friendly material isosorbide, a polycarbonate including the unit represented by Chemical Formula 1c has an advantage of being eco-friendly.

An exemplary embodiment of the present invention, the polycarbonate includes the unit represented by Chemical Formula 1a or 1b in an amount of 30 wt % or more, preferably 50 wt % or more, and more preferably 70 wt %, based on the total weight of the polycarbonate. The polycarbonate may include the unit represented by Chemical Formula 1a or 1b in an amount of 99 wt % or less, for example, 95 wt % or less, or 90 wt % or less.

According to an exemplary embodiment of the present invention, the polycarbonate includes the unit represented by Chemical Formula 1c in an amount of 30 wt % or more, preferably 50 wt % or more, and more preferably 70 wt %, based on the total weight of the polycarbonate. The polycarbonate may include the unit represented by Chemical Formula 1c in an amount of 99 wt % or less, for example, 95 wt % or less, or 90 wt % or less.

According to an exemplary embodiment of the present invention, the polycarbonate includes the unit represented by Chemical Formula 1a or 1b in an amount of 30 wt % to 70 wt % based on the total weight of the polycarbonate, and includes the unit represented by Chemical Formula 1c in an amount of 30 wt % to 70 wt % based on the total weight of the polycarbonate.

In the present invention, the contents of the structures included in the polycarbonate may be calculated by a typical method from the results after gel permeation chromatography (GPC) and melt index (MI) analysis using PS standard for the polycarbonate, and the specific measurement method is as described in the following examples.

According to an exemplary embodiment of the present invention, X1 of Chemical Formula 1a may be selected from the following structural formulae.

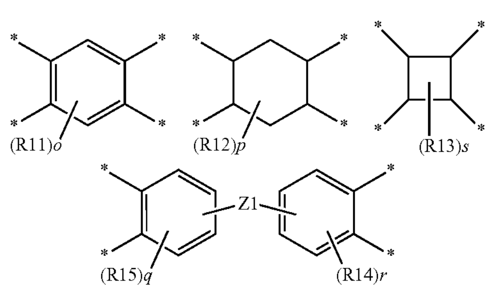

In the structural formulae,

R11 to R15 are each hydrogen, alkyl, aryl or heteroaryl, o is an integer from 0 to 2, p is an integer from 0 to 8, s is an integer from 0 to 4, q and r are each an integer from 0 to 3, and when o is 2, R11's are the same as or different from each other, and when p is 2 or higher, R12's are the same as or different from each other, and when s is 2 or higher, R13's are the same as or different from each other, and when q is 2 or higher, R15's are the same as or different from each other, and when r is 2 or higher, R14's are the same as or different from each other, and Z1 is a single bond; a substituted or unsubstituted straight-chained or branched alkylene; O or CO.

According to an example, Z1 is a single bond; a substituted or unsubstituted straight-chained or branched alkylene having 1 to 30 carbon atoms; O or CO.

According to an example, Z1 is a single bond; a substituted or unsubstituted straight-chained or branched alkylene having 1 to 20 carbon atoms; O or CO.

According to an example, Z1 is a single bond; a substituted or unsubstituted straight-chained or branched alkylene having 1 to 10 carbon atoms; O or CO.

According to an example, Z1 is a single bond; a substituted or unsubstituted straight-chained or branched alkylene having 1 to 5 carbon atoms; O or CO.

When Z1 is a substituted or unsubstituted branched alkylene, the number of carbon atoms thereof is 2 or higher.

According to an example, Z1 is a single bond; a substituted or unsubstituted straight-chained alkylene having 1 to 30 carbon atoms; O or CO.

According to an example, Z1 is a single bond; a substituted or unsubstituted straight-chained alkylene having 1 to 20 carbon atoms; O or CO.

According to an example, Z1 is a single bond; a substituted or unsubstituted straight-chained alkylene having 1 to 10 carbon atoms; O or CO.

According to an example, Z1 is a single bond; a substituted or unsubstituted straight-chained alkylene having 1 to 5 carbon atoms; O or CO.

According to an example, Z1 is a single bond; a substituted or unsubstituted methylene; O or CO.

According to an example, Z1 is a single bond; a methylene substituted with a methyl group; a methylene substituted with a trifluoromethyl group; O or CO.

According to an example, Z1 is a single bond.

According to an example, Z1 is $—C(CH_3)_2—$.

According to an example, Z1 is $—C(CF_3)_2—$.

According to an example, Z1 is O.

According to an example, Z1 is CO.

According to an example, R11 to R15 are each hydrogen or a C1 to C6 alkyl.

According to an example, R11 to R15 are each hydrogen or methyl.

According to an exemplary embodiment of the present invention, X2 of Chemical Formula 1b may be selected from the following structural formulae.

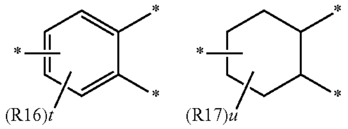

In the structural formulae,

R16 and R17 are each hydrogen, alkyl, aryl or heteroaryl, and when t is an integer from 0 to 3, u is an integer from 0 to 9, and when t is 2 or higher, R16's are the same as or different from each other, and when u is 2 or higher, R17's are the same as or different from each other.

According to an example, R16 and R17 are each hydrogen or a C1 to C6 alkyl.

According to an example, R16 and R17 are each hydrogen or methyl.

According to an exemplary embodiment of the present invention, L1 and L2 of Chemical Formula 1a are the same as or different from each other, and are each a single bond, a straight-chained or branched alkylene, cycloalkylene, arylene, a straight-chained or branched alkylene-cycloalkylene, cycloalkylene-a straight-chained or branched alkylene, a straight-chained or branched alkylene-cycloalkylene-a straight-chained or branched alkylene, a straight-chained or branched alkylene-arylene, arylene-a straight-chained or branched alkylene, or a straight-chained or branched alkylene-arylene-a straight-chained or branched alkylene, and here, the straight-chained or branched alkylene, cycloalkylene and arylene are each unsubstituted or substituted with alkoxy, COOR, alkyl or aryl, and R is hydrogen, alkyl or aryl.

According to an exemplary embodiment of the present invention, L1 and L2 of Chemical Formula 1a are the same as or different from each other, and are each a single bond, a straight-chained or branched alkylene, cycloalkylene, arylene, a straight-chained or branched alkylene-cycloalkylene, cycloalkylene-a straight-chained or branched alkylene, a straight-chained or branched alkylene-cycloalkylene-a straight-chained or branched alkylene, a straight-chained or branched alkylene-arylene, arylene-a straight-chained or branched alkylene, or a straight-chained or branched alkylene-arylene-a straight-chained or branched alkylene, and here, the straight-chained or branched alkylene, cycloalkylene and arylene are each unsubstituted or substituted with alkoxy, COOR, alkyl or aryl, R is hydrogen, or a C1 to C6 alkyl, the straight-chained or branched alkylene is a C1 to C6, the alkyl and alkoxy are a C1 to C12, the cycloalkylene is a C3 to C12, and the arylene and aryl are a C6 to C12.

According to an exemplary embodiment of the present invention, the branched alkylene may be a C2 to C6.

According to an exemplary embodiment of the present invention, L1 and L2 of Chemical Formula 1a are the same as or different from each other, and are each a single bond, methylene, ethylene, a straight-chained or branched propylene, a straight-chained or branched butylene, cyclohexylene, phenylene, methylene-cyclohexylene, cyclohexylene-methylene, methylene-cyclohexylene-methylene, phenylene-methylene, methylene-phenylene, or methylene-phenylene-methylene, and these are each unsubstituted or substituted with alkoxy, COOR, alkyl or aryl.

According to an exemplary embodiment of the present invention, L1 and L2 of Chemical Formula 1a are the same as or different from each other, and are each a single bond, methylene, ethylene, propylene, butylene, cyclohexylene, phenylene, methylene-cyclohexylene, cyclohexylene-methylene, methylene-cyclohexylene-methylene, phenylene-methylene, methylene-phenylene, or methylene-phenylene-methylene, and these are each unsubstituted or substituted with alkoxy, COOR, alkyl or aryl.

According to an exemplary embodiment of the present invention, L1 and L2 of Chemical Formula 1a are the same as or different from each other, and are each a single bond, methylene, ethylene, propylene or butylene, these are unsubstituted or substituted with a C1 to C5 alkyl, a C1 to C6 alkoxy, COOR or phenyl, and R is hydrogen or a C1 to C6 alkyl.

According to an exemplary embodiment of the present invention, L1 and L2 of Chemical Formula 1a are the same as or different from each other, and are each cyclohexylene, methylene-cyclohexylene, cyclohexylene-methylene, or methylene-cyclohexylene-methylene.

According to an exemplary embodiment of the present invention, L1 and L2 of Chemical Formula 1a are the same as or different from each other, and are each phenylene, phenylene-methylene, methylene-phenylene, or methylene-phenylene-methylene, these are each unsubstituted or substituted with a C1 to C6 alkoxy, COOR or a C1 to C6 alkyl, and R is hydrogen or a C1 to C6 alkyl.

According to an exemplary embodiment of the present invention, L1 and L2 of Chemical Formula 1a are methylene; an ethylene which is unsubstituted or substituted with a methyl group, a phenyl group or COOR; or a propylene which is unsubstituted or substituted with a methyl group, and R is a methyl group.

According to an exemplary embodiment of the present invention, L3 and L4 of Chemical Formula 1b are the same as or different from each other, and are each a single bond, a straight-chained or branched alkylene, cycloalkylene, arylene, a straight-chained or branched alkylene-cycloalkylene, cycloalkylene-a straight-chained or branched alkylene, a straight-chained or branched alkylene-cycloalkylene-a straight-chained or branched alkylene, a straight-chained or branched alkylene-arylene, arylene-a straight-chained or branched alkylene, or a straight-chained or branched alkylene-arylene-a straight-chained or branched alkylene, and here, the straight-chained or branched alkylene, cycloalkylene and arylene are each unsubstituted or substituted with alkoxy, COOR, alkyl or aryl, and R is hydrogen, alkyl or aryl.

According to an exemplary embodiment of the present invention, L3 and L4 of Chemical Formula 1b are the same as or different from each other, and are each a single bond, a straight-chained or branched alkylene, cycloalkylene, arylene, a straight-chained or branched alkylene-cycloalkylene, cycloalkylene-a straight-chained or branched alkylene, a straight-chained or branched alkylene-cycloalkylene-a straight-chained or branched alkylene, a straight-chained or branched alkylene-arylene, arylene-a straight-chained or branched alkylene, or a straight-chained or branched alkylene-arylene-a straight-chained or branched alkylene, and here, the straight-chained or branched alkylene, cycloalkylene and arylene are each unsubstituted or substituted with alkoxy, COOR, alkyl or aryl, R is hydrogen, or a C1 to C6 alkyl, the straight-chained or branched alkylene is a C1 to C6, the alkyl and alkoxy are a C1 to C12, the cycloalkylene is a C3 to C12, and the arylene and aryl are a C6 to C12.

According to an exemplary embodiment of the present invention, L3 and L4 of Chemical Formula 1b are the same as or different from each other, and are each a single bond, methylene, ethylene, a straight-chained or branched propylene, a straight-chained or branched butylene, cyclohexylene, phenylene, methylene-cyclohexylene, cyclohexylene-methylene, methylene-cyclohexylene-methylene, phenylene-methylene, methylene-phenylene, or methylene-phenylene-methylene, and these are each unsubstituted or substituted with alkoxy, COOR, alkyl or aryl.

According to an exemplary embodiment of the present invention, L3 and L4 of Chemical Formula 1b are the same as or different from each other, and are each a single bond, methylene, ethylene, propylene, butylene, cyclohexylene, phenylene, methylene-cyclohexylene, cyclohexylene-methylene, methylene-cyclohexylene-methylene, phenylene-methylene, methylene-phenylene, or methylene-phenylene-methylene, and these are each unsubstituted or substituted with alkoxy, COOR, alkyl or aryl.

According to an exemplary embodiment of the present invention, L4 of Chemical Formula 1b is a single bond, methylene, ethylene, a straight-chained or branched propylene, a straight-chained or branched butylene, cyclohexylene, methylene-cyclohexylene, cyclohexylene-methylene, or phenylene.

According to an exemplary embodiment of the present invention, L4 of Chemical Formula 1b is a single bond, methylene, ethylene, propylene, butylene, cyclohexylene, methylene-cyclohexylene, cyclohexylene-methylene, or phenylene.

According to an exemplary embodiment of the present invention, L3 of Chemical Formula 1b is a single bond or phenylene.

According to an exemplary embodiment of the present invention, L5 and L6 of Chemical Formula 1c are the same as or different from each other, and are each a single bond or a straight-chained or branched alkylene.

According to an exemplary embodiment of the present invention, L5 and L6 of Chemical Formula 1c are the same as or different from each other, and are each a single bond or a straight-chained or branched C1 to C6 alkylene.

According to an exemplary embodiment of the present invention, L5 and L6 of Chemical Formula 1c are the same as or different from each other, and are each a single bond, methylene, ethylene, propylene or butylene.

Furthermore, the weight average molecular weight (Mw) of the polycarbonate according to an exemplary embodiment of the invention may be appropriately adjusted according to the purpose and use, and the weight average molecular weight of the polycarbonate may be 40,000 g/mol or more, or 45,000 g/mol or more, or 48,000 g/mol or more and 80,000 g/mol or less, or 55,000 g/mol or less, or 50,000 g/mol or less, considering that it is possible to exhibit improved weather resistance while maintaining excellent characteristics of the polycarbonate itself, such as transparency and impact strength.

According to an exemplary embodiment of the present invention, the weight average molecular weight of the polycarbonate is 40,000 g/mol to 80,000 g/mol. The weight average molecular weight may be preferably 50,000 g/mol to 75,000 g/mol, and more preferably 51,000 g/mol to 74,000 g/mol. When the polycarbonate satisfies the above weight average molecular weight range, the productivity of the polycarbonate may be maintained at a high level while the mechanical properties are excellent.

Meanwhile, in the present invention, the weight average molecular weights (Mws) of the polycarbonate and the oligomer used in the preparation thereof may be measured by gel permeation chromatograph (GPC) using a polystyrene (PS) standard using Agilent 1200 series. Specifically, the weight average molecular weights may be measured using an Agilent 1200 series device using a Polymer Laboratories PLgel MIX-B 300 mm length column, and in this case, the measurement temperature is 160° C., the used solvent is 1,2,4-trichlorobenzene, and the flow rate is 1 mL/min. The sample of the polycarbonate or oligomer is each prepared at a concentration of 10 mg/10 mL, and then fed in an amount of 200 μL, and the Mw value is induced using a calibration curve formed using a polystyrene standard. In this case, nine types of polystyrene standard products with a molecular weight (g/mol) of 2,000/10,000/30,000/70,000/200,000/700,000/2,000,000/4,000,000/10,000,000 are used.

In the present invention, a melt index (MI) measured in accordance with ASTM D1238 (conditions of 300° C. and 1.2 kg) of the above polycarbonate can be appropriately adjusted according to the purpose and use, and may be 5 g/10 min or more, 7 g/10 min or more, 10 g/10 min or more, or 21 g/10 min or more, and 35 g/10 min or less, 34 g/10 min or less, 30 g/10 min or less, 28 g/10 min or less, or 26 g/10 min or less, in consideration of improved hardness. Preferably, the melt index may be 21 g/10 min or more and 26 g/10 min or less. When the polycarbonate satisfies the above the melt index range, there is an effect of improving the processability when the polycarbonate is injected.

In the present invention, the Izod room temperature impact strength of the polycarbonate measured at 23° C. in accordance with ASTM D256 (⅛ inch, Notched Izod) may be 200 J/m or more, or 210 J/m or more, or 220 J/m or more, or 300 J/m or more, or 330 J/m or more, and 500 J/m or less, or 400 J/m or less, or 370 J/m or less, or 360 J/m or less. Preferably, the Izod room temperature impact strength may be 330 J/m or more and 360 J/m or less. When the polycarbonate satisfies the above Izod room temperature impact strength range, there is an effect of improving the impact resistance of the injected product.

In the present invention, the pencil hardness of the polycarbonate may represent high hardness in F or HB when measured at an angle of 45 degrees under a load of 50 g in accordance with ASTM D3363.

According to an exemplary embodiment of the present invention, the polycarbonate further includes a unit of the following Chemical Formula 2.

[Chemical Formula 2]

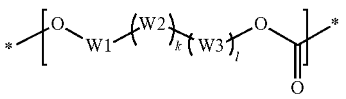

In Chemical Formula 2,

W1 and W3 are the same as or different from each other, and are each a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, or a substituted or unsubstituted heteroarylene, W2 is a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, a substituted or unsubstituted heteroarylene, O, S, SO, $SO_2$ or CO, k is an integer from 0 to 5, 1 is 0 or 1, provided that when W2 directly bound to W3 is O, S, SO, $SO_2$ or CO, 1 is 1, and when k is 2 or higher, W2's are the same as or different from each other, a plurality of units of Chemical Formula 2 included in the polycarbonate is the same as or different from each other, and

* means a site linked to the main chain of the polycarbonate.

According to an exemplary embodiment of the present invention, the polycarbonate may include the unit represented by Chemical Formula 2 in an amount of 70 wt % or less, for example, 50 wt % or less, and 10 wt % or more, based on the total weight of the polycarbonate. When the polycarbonate includes the unit represented by Chemical Formula 2 in an amount more than 70 wt %, the fluidity is improved, but the molecular weight is not increased to a desired value due to a decrease in degree of polymerization, and when the unit is included in an amount less than 10 wt %, the reactivity rapidly deteriorates.

According to an exemplary embodiment of the present invention, Chemical Formula 2 may be represented by one of the following Chemical Formulae 3 to 6.

[Chemical Formula 3]

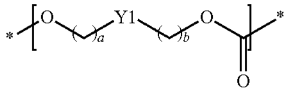

[Chemical Formula 4]

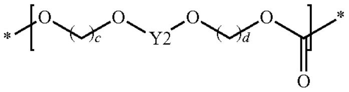

[Chemical Formula 5]

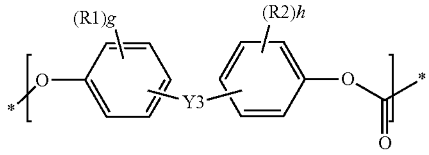

[Chemical Formula 6]

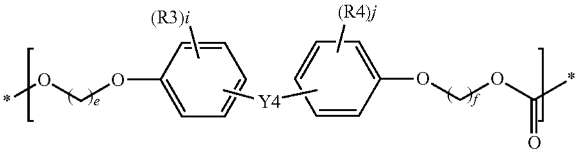

In Chemical Formulae 3 to 6,

Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, and g, h, i and j are each an integer from 0 to 4, a plurality of units of Chemical Formulae 3 to 6 included in the polycarbonate is the same as or different from each other, and

* means a site linked to the main chain of the polycarbonate.

According to an exemplary embodiment of the present invention, Y1 and Y2 are each a substituted or unsubstituted divalent aliphatic hydrocarbon group having 1 to 30 carbon atoms, a substituted or unsubstituted divalent isosorbide group, a substituted or unsubstituted arylene having 6 to 30 carbon atoms, or a substituted or unsubstituted heteroarylene having 1 to 30 carbon atoms.

According to an exemplary embodiment of the present invention, Y1 and Y2 are each a substituted or unsubstituted divalent aliphatic hydrocarbon group having 1 to 20 carbon atoms, a substituted or unsubstituted divalent isosorbide group, a substituted or unsubstituted arylene having 6 to 20 carbon atoms, or a substituted or unsubstituted heteroarylene having 1 to 20 carbon atoms.

According to an exemplary embodiment of the present invention, Y1 and Y2 are a divalent isosorbide group.

According to an exemplary embodiment of the present invention, Y3 and Y4 are each a substituted or unsubstituted straight-chained or branched alkylene having 1 to 30 carbon atoms, a substituted or unsubstituted cycloalkylene having 3 to 30 carbon atoms, O, S, SO, $SO_2$ or CO.

According to an exemplary embodiment of the present invention, Y3 and Y4 are each a substituted or unsubstituted straight-chained or branched alkylene having 1 to 20 carbon atoms, a substituted or unsubstituted cycloalkylene having 3 to 20 carbon atoms, O, S, SO, $SO_2$ or CO.

According to an exemplary embodiment of the present invention, R1 to R4 are the same as or different from each other, and are each hydrogen, a halogen, a substituted or unsubstituted alkyl having 1 to 30 carbon atoms, or a substituted or unsubstituted alkoxy having 1 to 30 carbon atoms.

According to an exemplary embodiment of the present invention, R1 to R4 are the same as or different from each other, and are each hydrogen, a halogen, a substituted or unsubstituted alkyl having 1 to 20 carbon atoms, or a substituted or unsubstituted alkoxy having 1 to 20 carbon atoms.

According to an exemplary embodiment of the present invention, $0 \leq a+b \leq 6$.

According to an exemplary embodiment of the present invention, $2 \leq c+d \leq 4$.

According to an exemplary embodiment of the present invention, e+f=2.

According to an exemplary embodiment of the present invention, the polycarbonate may have a hydroxy group or a phenyl end group.

Another exemplary embodiment of the present invention provides a method for preparing a polycarbonate including a unit represented by the above-described Chemical Formula 1a or 1b; and a unit represented by Chemical Formula 1c, the method including; polymerizing a composition including a compound of the following Chemical Formula 12a or 12b, a compound of the following Chemical Formula 12c and a carbonate precursor.

[Chemical Formula 12a]

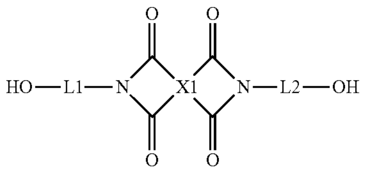

[Chemical Formula 12b]

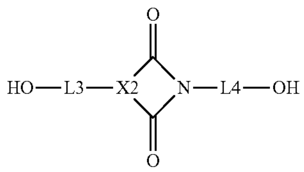

-continued

[Chemical Formula 12c]

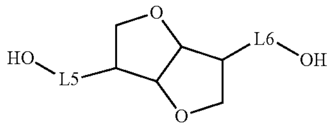

In Chemical Formulae 12a, 12b and 12c, the definitions of the substituents X1, X2 and L1-L6 are the same as those in Chemical Formulae 1a, 1b and 1c.

The compound represented by Chemical Formula 12c is not particularly limited to stereochemistry.

The compound represented by Chemical Formula 12c is an eco-friendly compound.

Preferred examples of the substituents X1, X2 and L1-L6 of Chemical Formulae 12a, 12b and 12c are the same as the description associated with the above-described Chemical Formulae 1a, 1b and 1c.

According to an exemplary embodiment of the present invention, the compound of Chemical Formula 12a or 12b may be represented by the following structures.

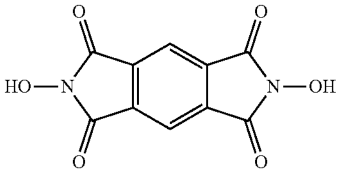

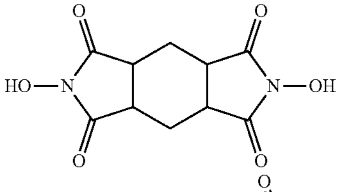

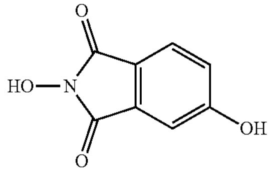

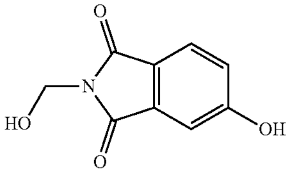

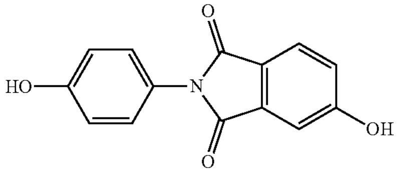

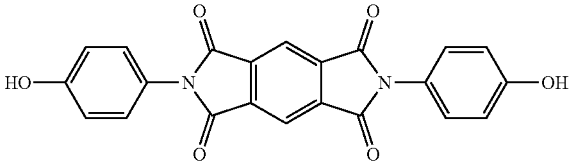

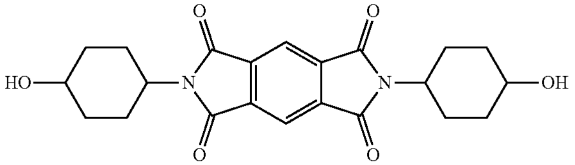

-continued
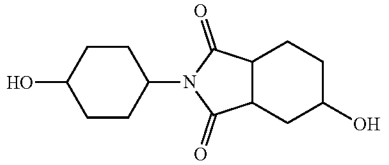
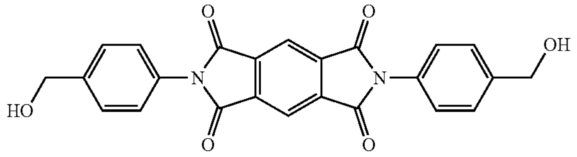
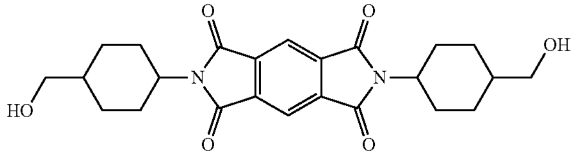
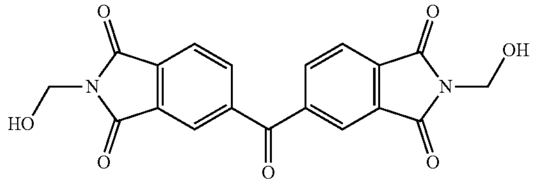
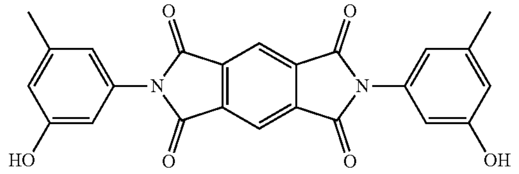
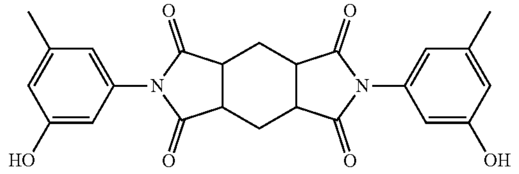
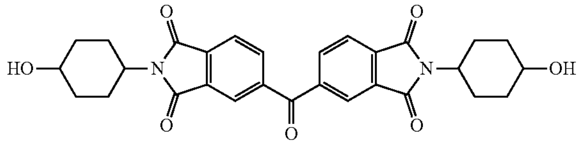
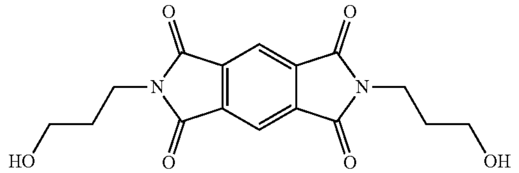
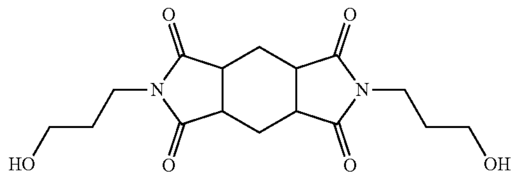
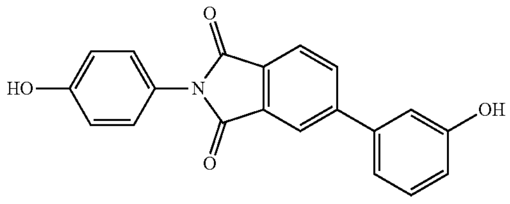
-continued
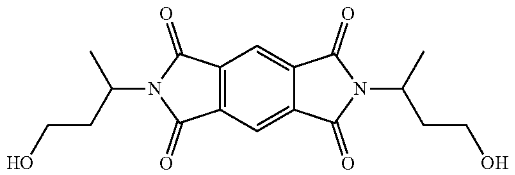
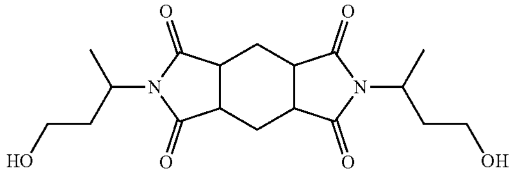
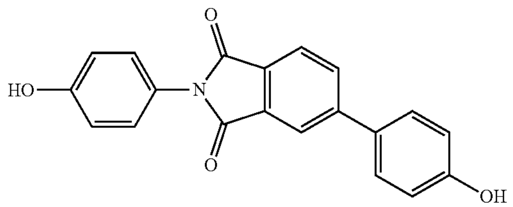
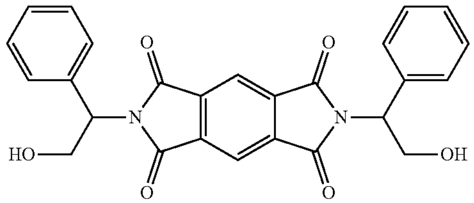
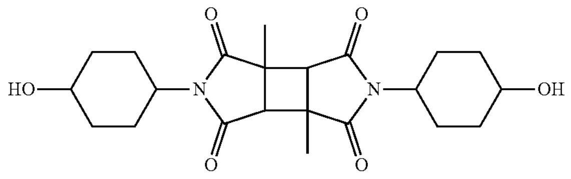
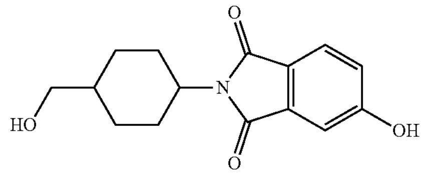
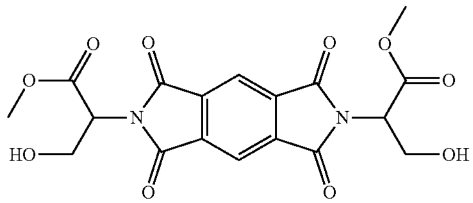
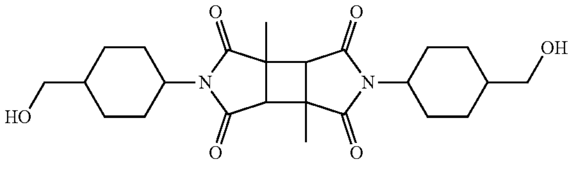
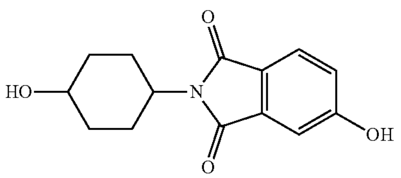

-continued

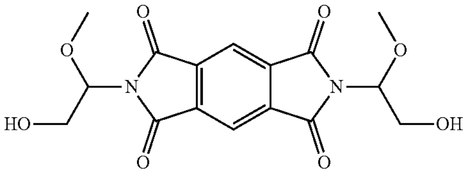

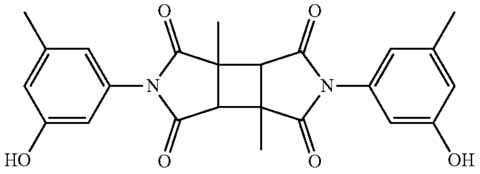

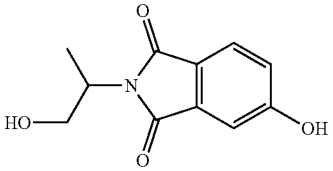

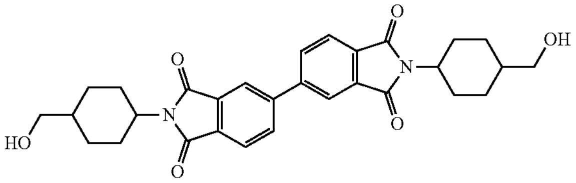

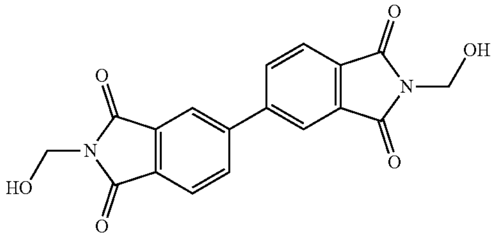

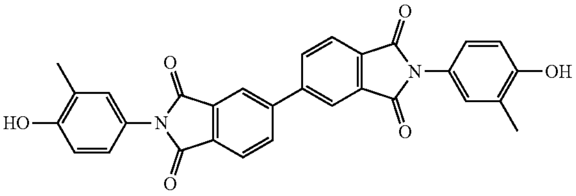

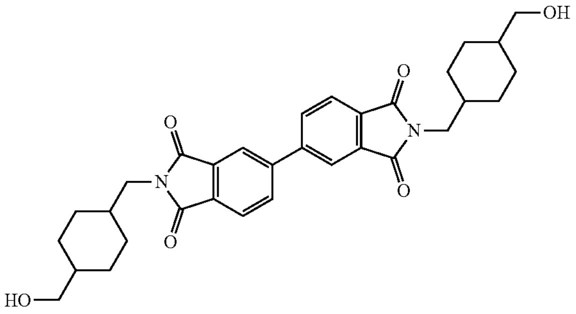

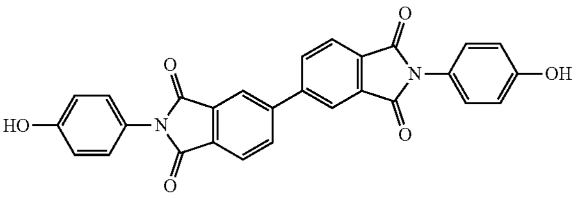

-continued

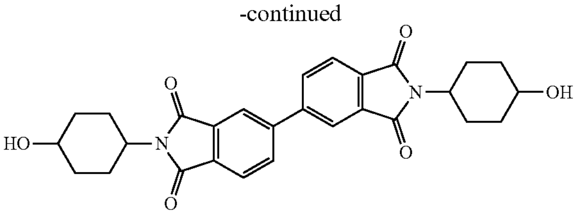

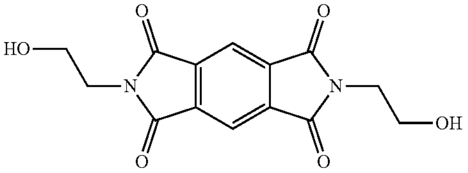

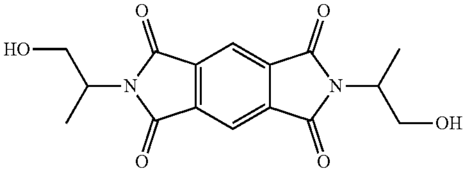

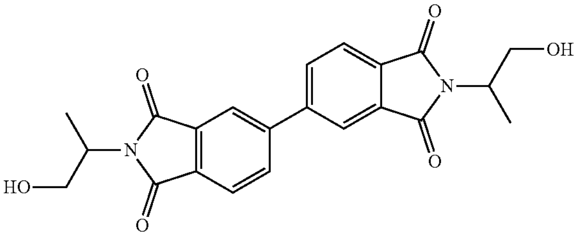

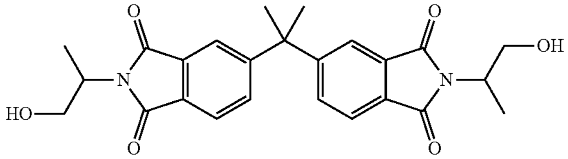

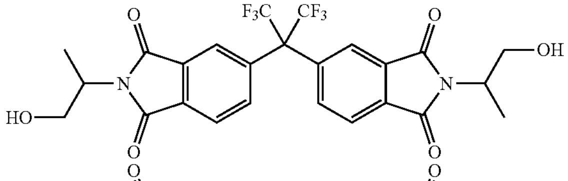

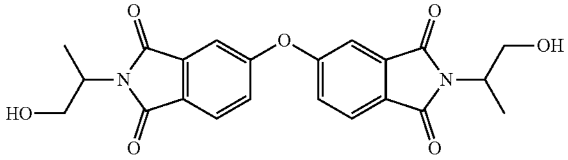

The compound of Chemical Formula 12a or 12b may be obtained by dissolving 1 equivalent of a dianhydride and 2.2 equivalents of an amino alcohol in a dimethylacetamide or dimethylformamide solvent, heating the resulting solution, and then adding dropwise water thereto when the reaction is completed, but a method of preparing the compound of Chemical Formula 12a or 12b is not limited thereto.

The compound of Chemical Formula 12c may be obtained by mixing 1 equivalent of isosorbide with 2.5 equivalents of a hydroxyalkyl halide, heating the resulting mixture under basic conditions, and then performing extraction in methylene chloride and water, followed by recrystallization, but a method of preparing the compound of Chemical Formula 12c is not limited thereto.

According to an exemplary embodiment of the present invention, the carbonate precursor may be represented by the following Chemical Formula 13.

[Chemical Formula 13]

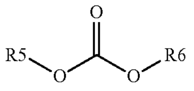

In Chemical Formula 13, R5 and R6 are the same as or different from each other, and are each independently a substituted or unsubstituted straight-chained or branched alkyl, a substituted or unsubstituted cycloalkyl, a substituted or unsubstituted aryl, or a substituted or unsubstituted heteroaryl.

The carbonate precursor serves to link the compound of Chemical Formula 12a or 12b, the compound of Chemical Formula 12c and an additional comonomer, if necessary. Specific examples thereof include phosgene, triphosgene, diphosgene, bromophosgene, dimethyl carbonate, diethyl carbonate, dibutyl carbonate, dicylcohexyl carbonate, diphenyl carbonate, ditolyl carbonate, bis(chlorophenyl) carbonate, m-cresyl carbonate, dinaphthyl carbonate, bis(diphenyl) carbonate, bishaloformate, or the like, and any one of them or a mixture of two or more thereof may be used.

The unit of the above-described Chemical Formula 1a or 1b may be formed by polymerizing the compound of Chemical Formula 12a or 12b with the carbonate precursor of Chemical Formula 13. The unit of the above-described Chemical Formula 1c may be formed by polymerizing the compound of Chemical Formula 12c with the carbonate precursor of Chemical Formula 13.

The compound of Chemical Formula 12a or 12b may be used in an amount of 10 parts by mole to 90 parts by mole, for example, 30 parts by mole to 80 parts by mole, based on the total 100 parts by mole of a diol compound included in the composition including the compound of Chemical Formula 12a or 12b, the compound of Chemical Formula 12c and the carbonate precursor.

The compound of Chemical Formula 12c may be used in an amount of 30 parts by mole to 100 parts by mole, for example, 40 parts by mole to 90 parts by mole, based on the total 100 parts by mole of a diol compound included in the composition including the compound of Chemical Formula 12a or 12b, the compound of Chemical Formula 12c and the carbonate precursor.

The carbonate precursor of Chemical Formula 13 may be used in an amount of 0.80 to 1.2 equivalents based on a diol compound included in the composition including the compound of Chemical Formula 12a or 12b, the compound of Chemical Formula 12c and the carbonate precursor.

The diol compound includes all compounds including two hydroxy groups in the composition.

For the polymerization, methods known in the art may be used.

According to an exemplary embodiment of the present invention, the composition used in the polymerization step may further include a compound of the following Chemical Formula 21.

[Chemical Formula 21]

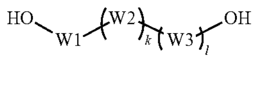

In Chemical Formula 21,

W1 and W3 are the same as or different from each other, and are each a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, or a substituted or unsubstituted heteroarylene, W2 is a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, a substituted or unsubstituted heteroarylene, O, S, SO, $SO_2$ or CO, and k is an integer from 0 to 5, l is 0 or 1, provided that when W2 directly bound to W3 is O, S, SO, $SO_2$ or CO, l is 1, and when k is 2 or higher, W2's are the same as or different from each other.

The compound of Chemical Formula 21 may be formed as the unit of the above-described Chemical Formula 2 by polymerization. The compound of Chemical Formula 21 may be used in an amount of 10 parts by mole to 90 parts by mole, 30 parts by mole to 80 parts by mole, for example, 40 parts by mole to 70 parts by mole, based on 100 parts by mole of the carbonate precursor of Chemical Formula 13.

According to an exemplary embodiment of the present invention, Chemical Formula 21 may be represented by the following Chemical Formula 31, 41, 51 or 61.

[Chemical Formula 31]

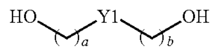

[Chemical Formula 41]

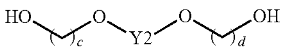

[Chemical Formula 51]

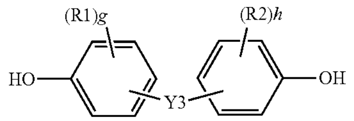

[Chemical Formula 61]

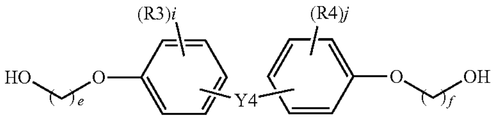

In Chemical Formulae 31, 41, 51 and 61,

Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, O, S, SO, $SO_2$ or CO, and R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, and g, h, i and j are each an integer from 0 to 4.

The description on the substituents Y1-Y4 and R1-R4 of the above-described Chemical Formulae 3 to 6 may be applied to the substituents Y1-Y4 and R1-R4 of Chemical Formulae 31 to 61.

Another exemplary embodiment of the present invention provides a composition including the polycarbonate according to the above-described exemplary embodiments. The composition including the polycarbonate may include one or more selected from the group consisting of a heat stabilizer, an antioxidant, a UV absorber and a polymerization catalyst.

In the present specification, examples of the heat stabilizer include phosphorous acid, phosphoric acid, phosphonous acid, phosphonic acid, esters thereof, and the like, and specifically, it is possible to use triphenylphosphite, tris(nonylphenyl)phosphite, tris(2,4-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2, 6-di-tert-butyl-4-methylphenyl)pentaerythritoldiphosphite, 2,2-methylenebis(4,6-di-tert-butylphenyl)octylphosphite, bis(nonylphenyl) pentaerythritoldiphosphite, bis(2,4-di-tert-butylphenyl) pentaerythritoldiphosphite, distearylpentaerythritoldiphosphite, dimethyl benzenephosphonate, diethyl benzenephosphonate, dipropyl benzenephosphonate or a combination of two or more thereof.

In the present specification, as a specific example of the antioxidant, it is possible to use pentaerythritol tetrakis(3-mercaptopropionate), pentaerythritol tetrakis(3-laurylthiopropionate), glycerol-3-stearyl thiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate, 4,4'-biphenylenediphospinic acid tetrakis(2,4-di-tert-butylphenyl), 3,9-bis{1,1-dimethyl-2-[β-(3-tert-butyl-4-hydroxy-5-methylphenyl)propionyloxy]ethyl}-2,4,8,10-tetraoxaspiro(5,5)undecane or a combination of two or more thereof.

In the present specification, as a specific example of the UV absorber, it is possible to use 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), 2,2'-p-phenylenebis(1,3-benzoxazin-4-one) or a combination of two or more thereof.

In the present specification, examples of the polymerization catalyst include a catalyst typically used in an esterification reaction or ester exchange reaction, such as a hydroxide of an alkali metal such as lithium hydroxide, sodium hydroxide, and potassium hydroxide, or an alkaline earth metal such as magnesium hydroxide, calcium hydroxide, and strontium hydroxide, a hydroxide of boron or aluminum, an alkoxide of an alkali metal salt, an alkaline earth metal salt, a quaternary ammonium salt, an alkali metal or an alkaline earth metal, an organic acid salt of an alkali metal or an alkaline earth metal, a zinc compound, a boron compound, a silicon compound, a germanium compound, an organic tin compound, a lead compound, an antimony compound, a manganese compound, a titanium compound, and a zirconium compound. Further, cesium carbonate may be used. The polymerization catalysts may be used either alone or in a combination of two or more.

When the heat stabilizer, antioxidant, UV absorber or polymerization catalyst is included in the composition including the polycarbonate, the content thereof is not particularly limited, and a content applied in the art can be appropriately applied.

Still another exemplary embodiment of the present invention provides a molded article prepared from a composition including the polycarbonate according to the above-described exemplary embodiments. As described above, since the polycarbonate including the unit represented by Chemical Formula 1a or 1b and the unit represented by Chemical Formula 1c has excellent hardness or heat resistance, the molded article according to the present invention has a wider range of applications than molded articles prepared from a polycarbonate used in the related art. In addition, when the polycarbonate further includes a repeating unit represented by Chemical Formula 2, the range of applications may be further expanded because desired physical properties can be implemented by adjusting the weight ratio of the units represented by Chemical Formulae 1a, 1b, 1c and 2.

The composition or molded article may further include one or more selected from the group consisting of an antioxidant, a plasticizer, an anti-static agent, a nucleating agent, a flame retardant, a lubricant, an impact modifier, a fluorescent brightener, a UV absorber, a pigment and a dye, if necessary, in addition to the aforementioned polycarbonate.

As an example of a method of preparing the molded article, it is possible to include mixing the aforementioned polycarbonate and other additives well using a mixer, preparing the resulting mixture as a pellet by extrusion molding the mixture using an extruder, drying the pellet, and then injecting the pellet using an injection molder.

EXAMPLES

Hereinafter, the present invention will be exemplified in more detail through Examples.

EXAMPLES

Example 1

(1) Synthesis Example of Monomer 1

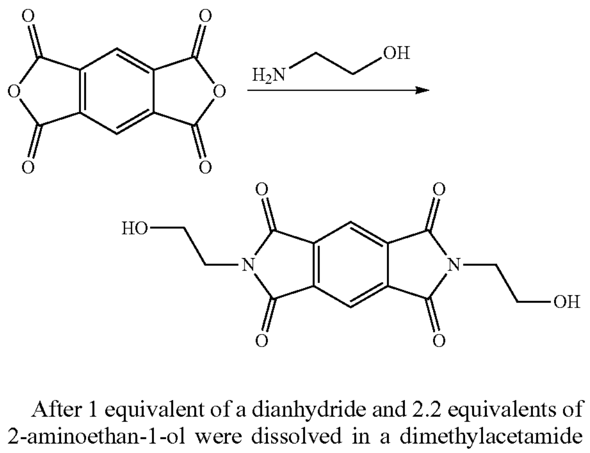

After 1 equivalent of a dianhydride and 2.2 equivalents of 2-aminoethan-1-ol were dissolved in a dimethylacetamide or dimethylformamide solvent, the resulting solution was heated at 120° C. During a reaction, the reaction was performed by installing a distillation trap. After the reaction was completed, water was added dropwise thereto, and then materials were filtered to obtain Monomer 1. (Yield: 68%, MS: $[M+H]^+=305.07$)

(2) Preparation of Polycarbonate

TABLE 1

| | Molecular weight (g/mol) | Equivalent (eq) | Mole number (mmol) | Content (g) |
|---|---|---|---|---|
| Monomer 1 | 304.26 | 0.3 | 0.098071 | 29.83916 |
| Isosorbide (ISB) | 144.21 | 0.7 | 0.228833 | 33 |
| Diphenyl carbonate (DPC) | 214.216 | 1.05 | 0.343249 | 73.52952 |
| Cesium carbonate ($Cs_2CO_3$) | 325.82 | 0.02 wt % based on total weight of Monomer 1 + ISB + DPC | — | 0.027274 |

As described in Table 1 above, Monomer 1, isosorbide (ISB), diphenyl carbonate (DPC) and 0.02 wt % of cesium carbonate ($Cs_2CO_3$) as a catalyst were introduced into a 1 L glass reactor, a reaction vessel was heated to 150° C. as a first step of the reaction under a nitrogen atmosphere, and the raw materials were melted under stirring, if possible. 0.02 wt of the cesium carbonate ($Cs_2CO_3$) means 0.02 wt % based on the total weight of Monomer 1, isosorbide and diphenyl carbonate.

As a second step of the reaction, the internal pressure of the reactor was reduced from atmospheric pressure to 100 Torr, the reaction temperature was increased to 230° C. for 80 minutes and maintained at the temperature for 40 minutes, and then phenol generated was removed while reducing the internal pressure to 28 Torr for 20 minutes while increasing the reaction temperature to 250° C. for 20 minutes. As a third step of the reaction, the temperature of the reactor was increased to 260° C. for 10 minutes, and the pressure in the reactor was allowed to reach 1 Torr or less in order to remove phenol additionally generated. After the reactor reached a predetermined stirring torque, the reaction was terminated, and a copolymer was prepared by taking produced reactants. As a result of GPC analysis using a PS standard, the prepared polycarbonate was found to have a weight average molecular weight of 60,100 g/mol.

Example 2

(1) Synthesis Example of Monomer 2

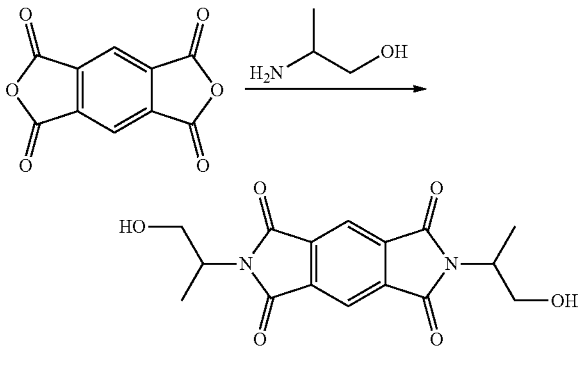

Monomer 2, which is a white solid, was obtained in the same manner as in Synthesis Example of Monomer 1 of Example 1, except that 1 equivalent of a dianhydride and 2.2 equivalents of 2-aminopropan-1-ol were used. (Yield: 65%, MS: $[M+H]^+=333.10$)

(2) Preparation of Polycarbonate

A polycarbonate was prepared in the same manner as in Example 1, except that Monomer 2 was used instead of Monomer 1 in Example 1. As a result of GPC analysis using a PS standard, the prepared polycarbonate was found to have a weight average molecular weight of 52,300 g/mol.

Example 3

(1) Synthesis Example of Monomer 3

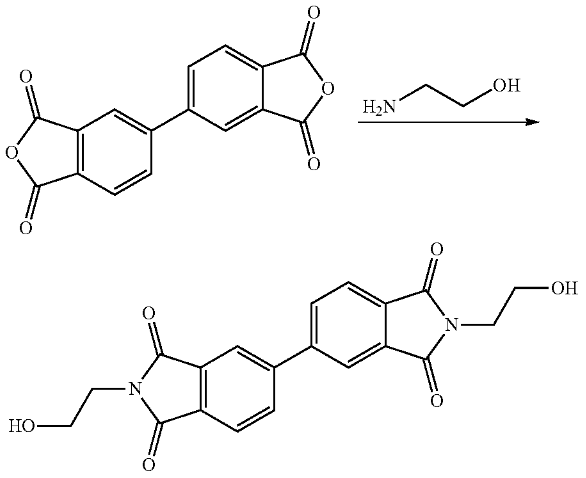

Monomer 3, which is a white solid, was obtained in the same manner as in Synthesis Example of Monomer 1 of Example 1, except that 1 equivalent of [5,5'-biisobenzofuran]-1,1',3,3'-tetraone and 2.2 equivalents of 2-aminoethan-1-ol were used. (Yield: 72%, MS: $[M+H]^+=381.10$)

(2) Preparation of Polycarbonate

A polycarbonate was prepared in the same manner as in Example 1, except that Monomer 3 was used instead of Monomer 1 in Example 1. As a result of GPC analysis using a PS standard, the prepared polycarbonate was found to have a weight average molecular weight of 51,500 g/mol.

Example 4

(1) Synthesis Example of Monomer 4

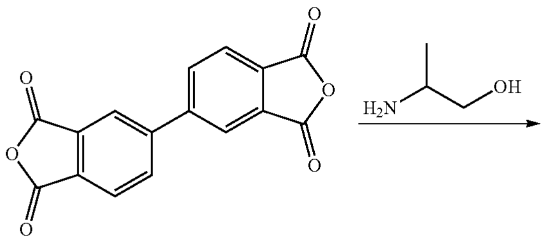

-continued

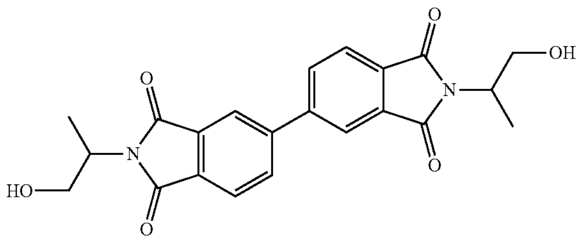

Monomer 4, which is a white solid, was obtained in the same manner as in Synthesis Example of Monomer 1 of Example 1, except that 1 equivalent of [5,5'-biisobenzofuran]-1,1',3,3'-tetraone and 2.2 equivalents of 2-aminopropan-1-ol were used. (Yield: 82%, MS: $[M+H]^+$=409.13)

(2) Preparation of polycarbonate

A polycarbonate was prepared in the same manner as in Example 1, except that Monomer 4 was used instead of Monomer 1 in Example 1. As a result of GPC analysis using a PS standard, the prepared polycarbonate was found to have a weight average molecular weight of 54,300 g/mol.

Example 5

(1) Synthesis Example of Monomer 5

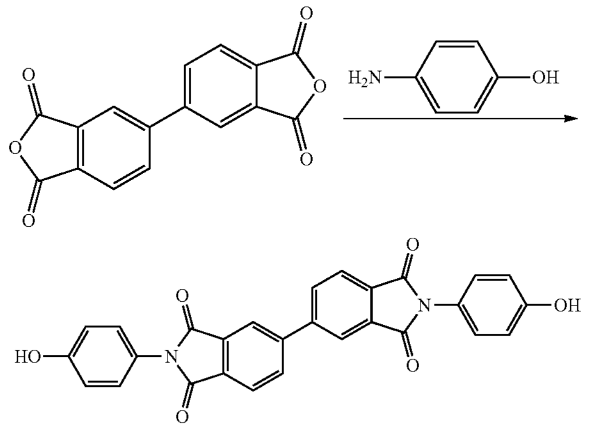

Monomer 5, which is a white solid, was obtained in the same manner as in Synthesis Example of Monomer 1 of Example 1, except that 1 equivalent of [5,5'-biisobenzofuran]-1,1',3,3'-tetraone and 2.2 equivalents of 4-aminophenol were used. (Yield: 86%, MS: $[M+H]^+$=477.10)

(2) Preparation of Polycarbonate

A polycarbonate was prepared in the same manner as in Example 1, except that Monomer 5 was used instead of Monomer 1 in Example 1. As a result of GPC analysis using a PS standard, the prepared polycarbonate was found to have a weight average molecular weight of 50,500 g/mol.

Example 6

(1) Synthesis Example of Monomer 6

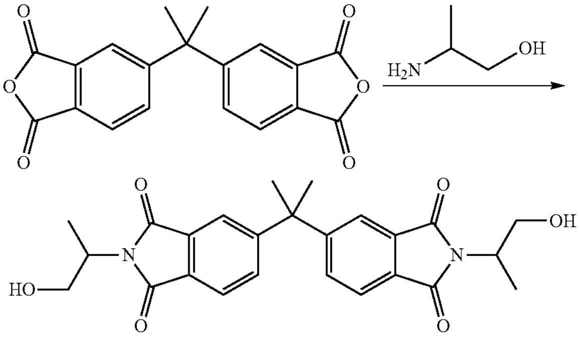

Monomer 6, which is a white solid, was obtained in the same manner as in Synthesis Example of Monomer 1 of Example 1, except that 1 equivalent of 5,5'-(propane-2,2-diyl)bis(isobenzofuran-1,3-dione) and 2.2 equivalents of 2-aminopropan-1-ol were used. (Yield: 67%, MS: $[M+H]^+$=451.18)

(2) Preparation of Polycarbonate

A polycarbonate was prepared in the same manner as in Example 1, except that Monomer 6 was used instead of Monomer 1 in Example 1. As a result of GPC analysis using a PS standard, the prepared polycarbonate was found to have a weight average molecular weight of 72,000 g/mol.

Example 7

(1) Synthesis Example of Monomer 7

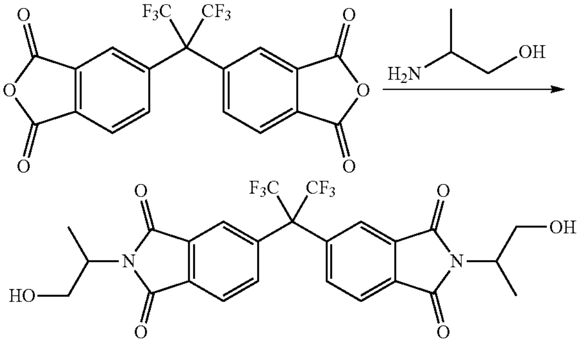

Monomer 7, which is a white solid, was obtained in the same manner as in Synthesis Example of Monomer 1 of Example 1, except that 1 equivalent of 5,5'-(perfluoropropane-2,2-diyl)bis(isobenzofuran-1,3-dione) and 2.2 equivalents of 2-aminopropan-1-ol were used. (Yield: 63%, MS: $[M+H]^+$=559.12)

(2) Preparation of Polycarbonate

A polycarbonate was prepared in the same manner as in Example 1, except that Monomer 7 was used instead of Monomer 1 in Example 1. As a result of GPC analysis using a PS standard, the prepared polycarbonate was found to have a weight average molecular weight of 69,600 g/mol.

Example 8

(1) Synthesis Example of Monomer 8

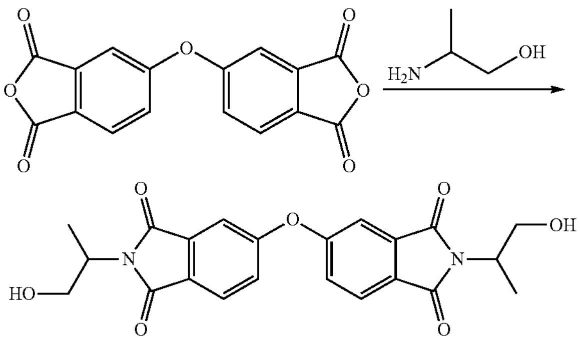

Monomer 8, which is a white solid, was obtained in the same manner as in Synthesis Example of Monomer 1 of Example 1, except that 1 equivalent of 5,5'-oxybis(isobenzofuran-1,3-dione) and 2.2 equivalents of 2-aminopropan-1-ol were used. (Yield: 74%, MS: $[M+H]^+$=425.13)

(2) Preparation of Polycarbonate

A polycarbonate was prepared in the same manner as in Example 1, except that Monomer 8 was used instead of Monomer 1 in Example 1. As a result of GPC analysis using a PS standard, the prepared polycarbonate was found to have a weight average molecular weight of 73,500 g/mol.

COMPARATIVE EXAMPLES

Comparative Example 1

A polycarbonate was prepared in the same manner as in Example 1, except that Monomer 1 was used alone instead of Monomer 1 and isosorbide (ISB) in Example 1. While polymerization occurred, the viscosity increased from the initial stage and a brown-colored polymerized product was obtained. As a result of GPC analysis using a PS standard, the prepared polycarbonate was found to have a weight average molecular weight of 5,100 g/mol.

Comparative Example 2

A polycarbonate was prepared in the same manner as in Example 1, except that isosorbide (ISB) was used alone instead of Monomer 1 and isosorbide (ISB) in Example 1. While polymerization occurred, a brown-coloring phenomenon was shown and a phenomenon in which the degree of polymerization was reduced to a very low level was shown. As a result of GPC analysis using a PS standard, the prepared polycarbonate was found to have a weight average molecular weight of 4,600 g/mol.

Comparative Example 3

620 g of water, 116.47 g of bisphenol A (BPA), 102.5 g of a 40 wt % aqueous NaOH solution, and 200 ml of dichloromethane (MeC12) were put into a 2 L main reactor capable of being maintained at room temperature with a circulator under a nitrogen atmosphere. After 62 g of triphosgene and 120 g of dichloromethane were put into a 1 L flask and the triphosgene was dissolved, the resulting solution was slowly added to the main reactor containing the bisphenol A (BPA) solution, then 2.66 g of p-tert-butylphenol (PTBP) was added thereto, and the resulting mixture was stirred. After 97 g of a 40 wt % aqueous NaOH solution was added thereto, 1.16 g of triethylamine (TEA) as a coupling agent was additionally added thereto. In this case, the pH of the reaction was maintained at 11 to 13. After the reaction was completed, the pH was dropped to 3 to 4 by adding HCl thereto, then stirring was stopped, a polymer layer and an aqueous layer were separated, then the aqueous layer was removed and only the polymer layer was extracted, and then polymer crystals were obtained using methanol. As a result of GPC analysis using a PS standard, the prepared polycarbonate was found to have a weight average molecular weight of 48,000 g/mol.

Experimental Example: Evaluation of Physical Properties of Polycarbonate 0.050 part by weight of tris(2,4-di-tert-butylphenyl)phosphite, 0.010 part by weight of octadecyl-3-(3,5-di-tert-butyl-4-hydroxyphenyl)propionate and 0.030 part by weight of pentaerythritol tetrastearate were added to 100 parts by weight of each of the polycarbonates prepared in the Examples and the Comparative Examples, the resulting mixture was pelletized using HAAKE Mini CTW with a vent attached, and then a test specimen was prepared by injection molding the pellet at a cylinder temperature of 300° C. and a mold temperature of 120° C. using an HAAKE Minijet injection molding system.

The characteristics of these injection test specimens or polycarbonates were measured by the following methods, and the results are shown in Table 1.

Measurement Method

Repeating unit: Measured by $^1$H-NMR using Varian 500 MHz.

Weight average molecular weight (g/mol): Measured by calibration with PC standard using Agilent 1200 series.

Melt index (MI, g/10 min): Measured in accordance with ASTM D1238 (under conditions of 300° C., 1.2 kg).

Pencil hardness: Measured with a pencil having a strength of 2B, B, HB, and F at an angle of 45 degrees under a load of 50 g in accordance with ASTM D3363 using a pencil hardness tester (Cometech).

Izod room temperature impact strength (J/m): Measured at 23° C. in accordance with ASTM D256 (⅛ inch, Notched Izod).

TABLE 2

| | Weight average molecular weight (g/mol) | MI (g/10 min) | Pencil hardness | Izod room temperature impact strength (J/m) |
|---|---|---|---|---|
| Example 1 | 60,100 | 23 | HB | 340 |
| Example 2 | 52,300 | 21 | HB | 350 |
| Example 3 | 51,500 | 25 | HB | 340 |
| Example 4 | 54,300 | 24 | HB | 360 |
| Example 5 | 50,500 | 25 | HB | 330 |
| Example 6 | 72,000 | 26 | F | 350 |
| Example 7 | 69,600 | 24 | F | 350 |
| Example 8 | 73,500 | 26 | HB | 340 |

TABLE 2-continued

| | Weight average molecular weight (g/mol) | MI (g/10 min) | Pencil hardness | Izod room temperature impact strength (J/m) |
|---|---|---|---|---|
| Comparative Example 1 | 5,100 | — | — | — |
| Comparative Example 2 | 4,600 | — | — | — |
| Comparative Example 3 | 48,000 | 15 | 2B | 320 |

According to Table 2, Comparative Examples 1 and 2 had a weight average molecular weight of 10,000 g/mol or less, meaning that extrusion and injection could not be properly performed because polymerization was not properly performed, so that the melt index, pencil hardness and Izod room temperature impact strength could not be measured.

Meanwhile, it could be confirmed that each of Examples 1 to 8 had excellent pencil hardness and high Izod room temperature impact strength compared to Comparative Examples 1-3.

Through this, it could be confirmed that the polycarbonate according to the present invention had excellent mechanical properties by including the unit represented by Chemical Formula 1a or 1b, and had excellent hardness by further including the unit represented by Chemical Formula 1c.

The invention claimed is:

1. A polycarbonate comprising a unit represented by the following Chemical Formula 1a or 1b; and a unit represented by the following Chemical Formula 1c:

[Chemical Formula 1a]

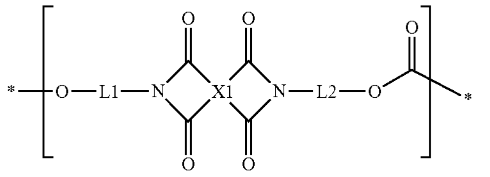

[Chemical Formula 1b]

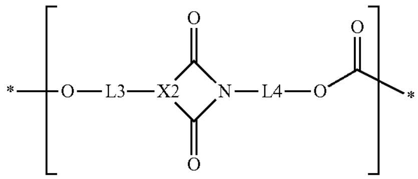

[Chemical Formula 1c]

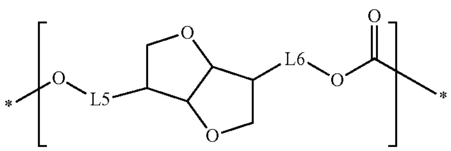

in Chemical Formulae 1a, 1b and 1c, wherein X1 is one selected from a substituted or unsubstituted aliphatic ring and a substituted or unsubstituted aromatic ring, or a tetravalent group in which two or more of them are linked by a single bond; a substituted or unsubstituted straight-chained or branched alkylene; O or CO, X2 is one selected from a substituted or unsubstituted aliphatic ring and a substituted or unsubstituted aromatic ring, or a trivalent group in which two or more of them are linked by a single bond; a substituted or unsubstituted straight-chained or branched alkylene; O or CO, L1 to L6 are the same as or different from each other, and are each one selected from a single bond, a substituted or unsubstituted straight-chained or branched alkylene, a substituted or unsubstituted cycloalkylene and a substituted or unsubstituted arylene, or a divalent group in which two or more of them are linked by a single bond, a plurality of units of Chemical Formulae 1a, 1b and 1c included in the polycarbonate is each the same as or different from each other, and

* means a site linked to the main chain of the polycarbonate.

2. The polycarbonate of claim 1, wherein the polycarbonate comprises the unit represented by Chemical Formula 1a or 1b in an amount of 30 wt % to 70 wt %, based on a total weight of the polycarbonate, and comprises the unit represented by Chemical Formula 1c in an amount of 30 wt % to 70 wt %, based on the total weight of the polycarbonate.

3. The polycarbonate of claim 1, wherein the polycarbonate has a weight average molecular weight of 40,000 g/mol to 80,000 g/mol.

4. The polycarbonate of claim 1, wherein X1 is selected from the following structural formulae:

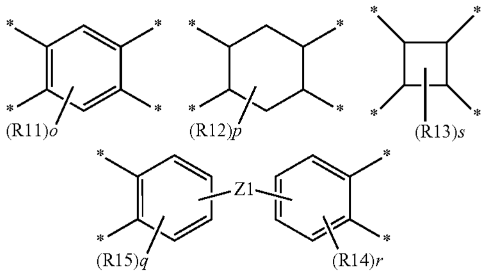

in the structural formulae, wherein R11 to R15 are each hydrogen, alkyl, aryl or heteroaryl, o is an integer from 0 to 2, p is an integer from 0 to 8, s is an integer from 0 to 4, q and r are each an integer from 0 to 3, and when o is 2, R11's are the same as or different from each other, when p is 2 or higher, R12'are the same as or different from each other, when s is 2 or higher, R13's are the same as or different from each other, when q is 2 or higher, R15's are the same as or different from each other, when r is 2 or higher, R14's are the same as or different from each other, and Z1 is a single bond; a substituted or unsubstituted straight-chained or branched alkylene; O or CO.

5. The polycarbonate of claim 1, wherein X2 is selected from the following structural formulae:

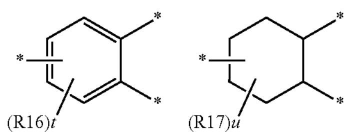

in the structural formulae, wherein R16 and R17 are each hydrogen, alkyl, aryl or heteroaryl, t is an integer from 0 to 3, u is an integer from 0 to 9, when t is 2 or higher, R16's are the same as or different from each other, and when u is 2 or higher, R17's are the same as or different from each other.

6. The polycarbonate of claim 1, wherein the polycarbonate further comprises a unit of the following Chemical Formula 2:

[Chemical Formula 2]

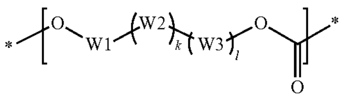

in Chemical Formula 2, wherein W1 and W3 are the same as or different from each other, and are each a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, or a substituted or unsubstituted heteroarylene, W2 is a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, a substituted or unsubstituted heteroarylene, O, S, SO, $SO_2$ or CO, k is an integer from 0 to 5, l is 0 or 1, provided that when W2 directly bound to W3 is O, S, SO, $SO_2$ or CO, 1 is 1, and when k is 2 or higher, W2's are the same as or different from each other, a plurality of units of Chemical Formula 2 included in the polycarbonate is-are the same as or different from each other, and

* means a site linked to the main chain of the polycarbonate.

7. The polycarbonate of claim 6, wherein Chemical Formula 2 is represented by one of the following Chemical Formulae 3 to 6:

[Chemical Formula 3]

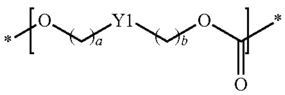

[Chemical Formula 4]

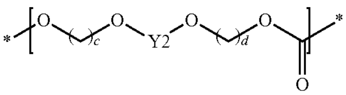

[Chemical Formula 5]

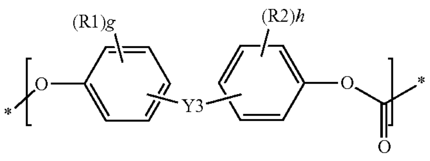

-continued

[Chemical Formula 6]

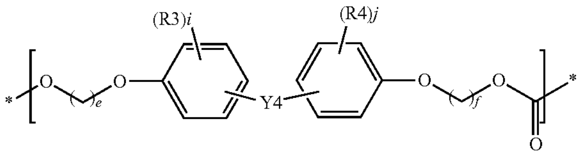

in Chemical Formulae 3 to 6, wherein Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, and g, h, i and j are each an integer from 0 to 4, a plurality of units of Chemical Formulae 3 to 6 included in the polycarbonate are the same as or different from each other, and

* means a site linked to the main chain of the polycarbonate.

8. A method for preparing the polycarbonate according to claim 1, the method comprising:

polymerizing a composition comprising a compound of the following Chemical Formula 12a or 12b, a compound of the following Chemical Formula 12c and a carbonate precursor:

[Chemical Formula 12a]

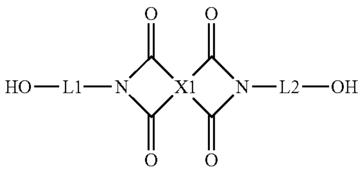

[Chemical Formula 12b]

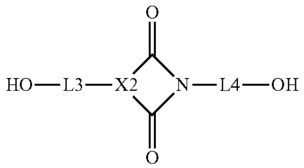

[Chemical Formula 12c]

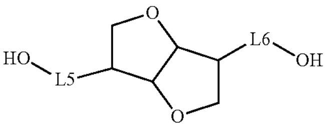

in Chemical Formulae 12a, 12b and 12c, wherein X1 is one selected from a substituted or unsubstituted aliphatic ring and a substituted or unsubstituted aromatic ring, or a tetravalent group in which two or more of them are linked by a single bond; a substituted or unsubstituted straight-chained or branched alkylene; O or CO, X2 is one selected from a substituted or unsubstituted aliphatic ring and a substituted or unsubstituted aromatic ring, or a trivalent group in which two or more of them are linked by a single bond; a substituted or unsubstituted straight-chained or branched alkylene; O or CO, L1 to L6 are the same as or different from each other, and are each one selected from a single bond, a substituted or unsubstituted straight-chained or branched alkylene, a substituted or unsubstituted cycloalkylene and a substituted or unsubstituted arylene, or a divalent group in which two or more of them are linked by a single bond.

9. The method of claim 8, wherein the carbonate precursor is represented by the following Chemical Formula 13:

[Chemical Formula 13]

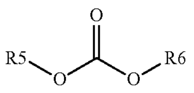

in Chemical Formula 13, wherein R5 and R6 are the same as or different from each other, and are each independently a substituted or unsubstituted straight-chained or branched alkyl, a substituted or unsubstituted cycloalkyl, a substituted or unsubstituted aryl, or a substituted or unsubstituted heteroaryl.

10. The method of claim 8, wherein the composition further comprises a compound of the following Chemical Formula 21:

[Chemical Formula 21]

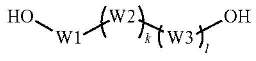

in Chemical Formula 21, wherein W1 and W3 are the same as or different from each other, and are each a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, or a substituted or unsubstituted heteroarylene, W2 is a substituted or unsubstituted divalent aliphatic hydrocarbon group, a substituted or unsubstituted divalent isosorbide group, a substituted or unsubstituted alkylene, a substituted or unsubstituted cycloalkylene, a substituted or unsubstituted arylene, a substituted or unsubstituted heteroarylene, O, S, SO, $SO_2$ or CO, and k is an integer from 0 to 5, l is 0 or 1, provided that when W2 directly bound to W3 is O, S, SO, $SO_2$ or CO, l is 1, and when k is 2 or higher, W2's are the same as or different from each other.

11. The method of claim 10, wherein Chemical Formula 21 is represented by the following Chemical Formula 31, 41, 51 or 61:

[Chemical Formula 31]

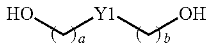

[Chemical Formula 41]

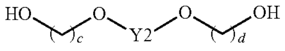

[Chemical Formula 51]

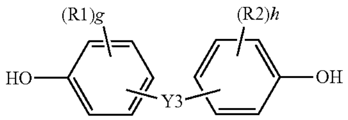

[Chemical Formula 61]

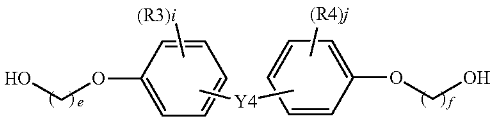

in Chemical Formulae 31, 41, 51 and 61, wherein Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, O, S, SO, $SO_2$ or CO, and R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, and g, h, i and j are each an integer from 0 to 4.

12. A composition comprising the polycarbonate according to claim 1.

13. A molded article prepared from a composition comprising the polycarbonate according to claim 1.

* * * * *